US008451927B2

(12) United States Patent
Sanada et al.

(10) Patent No.: US 8,451,927 B2
(45) Date of Patent: May 28, 2013

(54) MULTICARRIER COMMUNICATION SYSTEM

(75) Inventors: Yukitoshi Sanada, Yokohama (JP); Haruki Higuchi, Yokohama (JP)

(73) Assignee: Keio University, Tokyo (JP)

( * ) Notice: Subject to any disclaimer, the term of this patent is extended or adjusted under 35 U.S.C. 154(b) by 251 days.

(21) Appl. No.: 12/996,707

(22) PCT Filed: Jun. 2, 2009

(86) PCT No.: PCT/JP2009/002448
§ 371 (c)(1),
(2), (4) Date: Dec. 7, 2010

(87) PCT Pub. No.: WO2010/001528
PCT Pub. Date: Jan. 7, 2010

(65) Prior Publication Data
US 2011/0096818 A1    Apr. 28, 2011

(30) Foreign Application Priority Data

Jul. 4, 2008    (JP) .................................. 2008-176119

(51) Int. Cl.
*H04B 7/02*    (2006.01)
(52) U.S. Cl.
USPC ....................................................... 375/267
(58) Field of Classification Search
USPC ................................................ 375/260, 267
See application file for complete search history.

(56) References Cited

U.S. PATENT DOCUMENTS

| | | | | |
|---|---|---|---|---|
| 6,243,412 | B1 * | 6/2001 | Fukawa | 375/219 |
| 7,042,926 | B2 * | 5/2006 | Yellin et al. | 375/147 |
| 2006/0068698 | A1 * | 3/2006 | Sandhu et al. | 455/1 |
| 2009/0124210 | A1 | 5/2009 | Imai et al. | |
| 2012/0140838 | A1 * | 6/2012 | Kadous et al. | 375/267 |

FOREIGN PATENT DOCUMENTS

| | | |
|---|---|---|
| JP | B2-3677492 | 8/2005 |
| JP | A-2008-79217 | 4/2008 |
| WO | WO 2007/052768 A1 | 5/2007 |

OTHER PUBLICATIONS

Adachi et al.; "Consideration About Frequency Selectively Channel MIMO Channel Capacity;" *The Institute of Electronics, Information and Communication Engineers General Conference*; Mar. 2008 (with translation).
Tepedelenlioglu et al.; "Low-Complexity Multipath Diversity Through Fraction Sampling in OFDM;" *IEEE Transactions on Signal Processing*; Nov. 2004; pp. 3104-3116; vol. 52, No. 11.
Dammann et al.; "Standard Conformable Antenna Diversity Techniques for OFDM and its Application to the DVB-T System;" *IEEE Globecom*; Nov. 2001; pp. 3100-3105; vol. 5.
Kobayashi et al.; MIMO System with Relative Phase Difference Time-Shift Modulation in Rician Fading Environments; *Trans. of IEICE*: Feb. 2008; pp. 459-465; vol. E91-B, No. 2.
Wang et al.; "Deliberately Designed Asynchronous Transmission Scheme for MIMO Systems; *IEEE Signal Processing Letters;*" Dec. 2007; pp. 920-923; vol. 14, No. 12.
Tamura et al.; Fractional Sampling OFDM/OQAM-IOTA on Multipath Channel with Long Delay Spread; *IEEE Pacific Rim Conference on Communications Computers and Signal Processing*, 2007. PacRim 2007; Aug. 22, 2007; pp. 510-513.
Lu et al.; "SVD-based Frequency Domain Equalizer for MIMO-CDMA Systems Using Virtual Antennas;" *IEEE 68th Vehicular Technology Conference*, 2008; VTC 2008—Fall; Sep. 21, 2008; pp. 1-5.
Sanada et al.; Multipath Diversity through Time Shifted Sample in Spatially Correlated OFDM-Antenna Array Systems; *IEEE 68th Vehicular Technology Conference*, 2008; VTC 2008—Fall; Sep. 21, 2008; pp. 1-5.
International Search Report dated Jun. 30, 2009 in corresponding International Application No. PCT/JP2009/002448 (with translation).
Written Opinion of the International Searching Authority dated Jun. 30, 2009 in corresponding International Application No. PCT/JP2009/002448 (with translation).

* cited by examiner

*Primary Examiner* — Don N Vo
(74) *Attorney, Agent, or Firm* — Oliff & Berridge, PLC

(57) ABSTRACT

Improving channel response characteristics between a transmitter and a receiver, in a Multiple-Input-Multiple-Output (MIMO)-system without increasing the number of receiving antennas, by using fractional sampling in a receiver, delaying and transmitting part of plural transmitting signals demodulating data of the plural data series.

5 Claims, 10 Drawing Sheets

(a)

(b)

(a)

(b)

(a)

(b)

(a)

(b)

(a)

(b)

MULTICARRIER COMMUNICATION SYSTEM

TECHNICAL FIELD

This invention relates to a multi-carrier communications system, especially a MIMO (Multiple-Input-Multiple-Output) system that can increase a channel capacity despite a small number of antennas in a receiver.

TECHNICAL BACKGROUND

A MIMO system achieves diversity increasing transmission rate by that a transmitter transmits different information through plural antennas using the same carrier wave, and a receiver separates and composes signals.

A channel capacity of a MIMO system is restricted by the number of antennas of a receiving side (when it is less than the number of antennas of a sending side), and when the number of antennas is Nr, channel capacity becomes only Nr times at most.

A fractional sampling is proposed as a method for increasing the number of antennas equivalently.

A fractional sampling system attains diversity with G antennas equivalently using a sampling G times faster than a sampling speed required in a conventional OFDM demodulation ("G" is a positive integer.).

By this structure, it is possible to increase a channel capacity of a MIMO system.

PRIOR ART DOCUMENTS

Patent Document

Patent document 1: Patent publication No. 3677492

Non-Patent Document

Non-patent document 1: Fumiyuki Adachi, Koichi Adachi, Yohei Kojima, Kazuki Takeda, "Consideration about frequency selectivity channel MIMO channel capacity", The Institute of Electronics, Information and Communication Engineers General Conference, BS-1-4 March 2008.

Non-patent document 2: C. Tepedelenlioglu and R. Challagulla, "Low-Complexity Multipath Diversity Through Fractional Sampling in OFDM", IEEE Transactions one Signal Processing, vol. 52, No. 11, pp. 3104-3116, November 2004.

Non-patent document 3: A. Dammann, S. Kaiser, "Standard conformable antenna diversity techniques for OFDM and its application to the DVB-T system," IEEE GLOBECOM '01, vol. 5, pp. 3100-3105, November 2001.

Non-patent document 4: K. Kobayashi, T. Someya, T. Ohtsuki, S. P W. Sigit, and T. Kashima, "MIND System with Relative Phase Difference Time-Shift Modulation for Rician Fading Environment," Trans. of IEICE, E91-B, no. 2, pp. 459-465, February 2008.

SUMMARY OF THE INVENTION

Problems to be Solved by the Invention

The non-patent document 2 describes a matter of attaining diversity with G antennas equivalently, and in case of a MIMO system, it describes to increase a channel capacity by sampling G times faster than a sampling speed required by a conventional OFDM demodulation using a fractional sampling.

However, for attaining diversity by a fractional sampling, it is necessary that there is a delay path corresponding to the fractional sampling.

When a multipath does not exist, diversity cannot be attained, and in case of MIMO, channel capacity cannot be increased.

About a delay transmission, there is the non-patent document 3. However, a system indicated in this document is to compound signals from plural antennas before demodulating, and there is no diversity effect in a MIMO (below-mentioned effect of increasing a rank of matrix).

Moreover, a MIMO system that combines delay transmission and fractional sampling is not studied.

The non-patent document 4 describes a method of changing a channel response by rotating a phase in a transmitting side, when performing MIMO transmission using plural antennas in a receiving side. However, this method is to prevent a state that a signal separation becomes impossible, and there is no effect of increasing the below-mentioned rank of matrix $H(k)H^H(k)$.

Moreover, it is not a system corresponding to fractional sampling.

The patent document 1 describes a structure of a multicarrier transmission that transmits plural data series from plural antennas by duplicating data of each stream of the plural data series to the number of antennas, and transmits the data obtained by the duplicating from the plural antennas after delaying for delay times different in each antenna.

The above-mentioned structure is to receive data transmitted from plural antennas by plural antennas, and it is to prevent the data of the part corresponding to a difference of delay times from interfering to the following data by arranging an apparent data transmitting timing, by moving the data of the part corresponding to the difference of the delay time of the delayed data in each series.

The technology described in this document is not using a fractional sampling.

This invention is to attain diversity equivalently using a fractional sampling, and to offer a structure that attains diversity surely in a structure that increases a channel capacity of a MIMO system.

This invention is to reduce the number of receiving antennas by a receiver performing a fractional sampling and a transmitter has a structure to transmit signals after delaying at least one transmitting signal corresponding to the fractional sampling interval, and in a MIMO system, the transmitter transmits different information from plural antennas using the same subcarrier and the receiver separates the different information.

Moreover, a receiver of another embodiment has a structure to direct a transmitter to transmit signals after delaying at least one transmitting signal based on a result of a demodulation of a pilot signal.

Effect of the Invention

According to a structure of this invention, a receiver can ensure diversity by using fractional sampling and increasing receiving antennas equivalently, and it becomes possible to extract transmitted data from a received signal correctly and easily.

The First Embodiment

Figure 1:
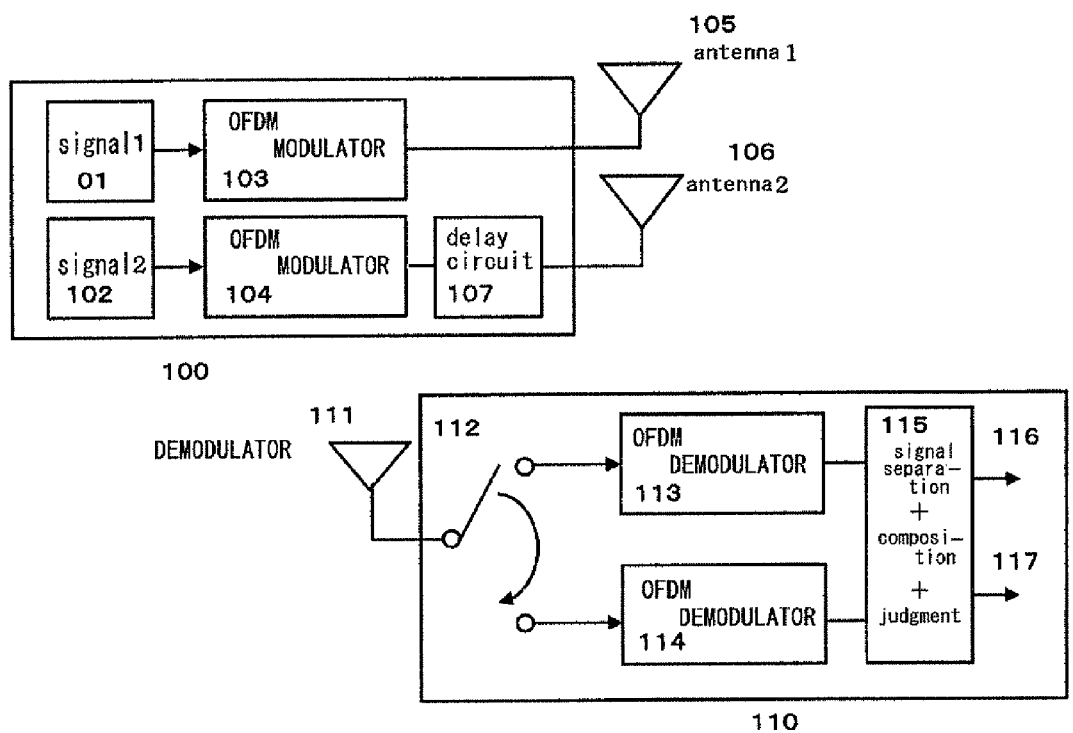
FIG. 1 A figure showing a structure of the 1st embodiment

FIG. 1 is a figure of the 1st embodiment of a MIMO system of this invention.

This figure is an example that transmits two signals simultaneously by OFDM modulating using the same subcarrier, and consists of a transmitter 100 and a receiver 110.

A 1st signal 101 of the transmitter 100 is modulated by a 1st OFDM modulator 103 and transmitted from an antenna 105.

A 2nd signal 102 is modulated by a 2nd OFDM modulator 104 and delayed a predetermined time by a delay circuit 107, and then transmitted from an antenna 106.

The receiver 110 has one antenna 111, and performs fractional sampling by switching and connecting alternately to a 1st OFDM demodulator 113 and a 2nd OFDM demodulator 114 by a switch circuit 112 within one signal period (transmitting pulse period).

The OFDM demodulator 113 and the OFDM demodulator 114 input a demodulated signal into a control circuit 115.

The control circuit 115 retrieves a channel response matrix between the transmitter 100 and the receiver 110 according to a technique of MIMO.

The receiver 110 separates a received signal using the above-mentioned channel response matrix, and outputs two outputs 116 and 117 corresponding to the 1st signal 101 and the 2nd signal 102 that the transmitter 100 transmitted.

Figure 2:
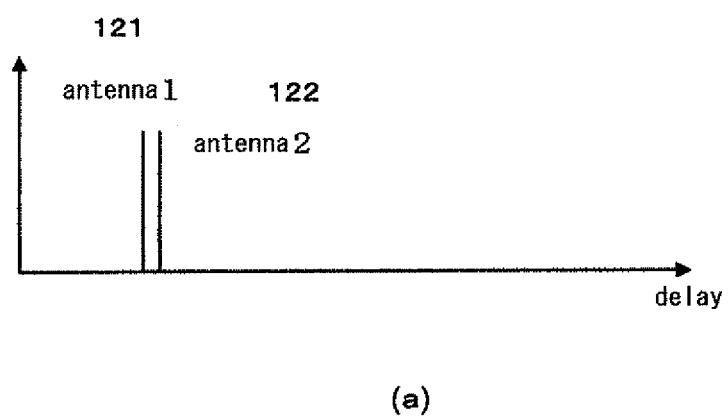
FIG. 2 A figure of a conventional transmitting timing and a figure of a transmitting timing in the 1st embodiment FIG. 3 A figure of a conventional receiving timing and a figure of a receiving timing in the 1st embodiment FIG. 4 Graph of channel capacity of a conventional system, and graph of channel capacity of the 1st embodiment FIG. 5-1 A block diagram of channel capacity of a conventional delay transmitting diversity receiving system, and a block diagram of a channel capacity of the 1st embodiment FIG. 5-2 Parameters and result of a simulation of channel capacity of a conventional delay transmitting diversity receiving system and the 1st embodiment FIG. 6-1 A figure showing another structure of the 1st embodiment FIG. 6-2 A figure showing a structure with four transmitting antennas and two receiving antennas in FIG. 6-1
Figure 2:
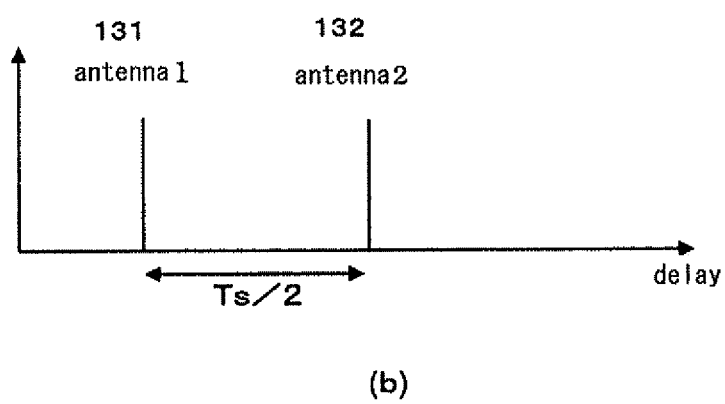

FIG. 2 is a figure showing a relation of signals transmitted from two antennas.

The (a) in this figure is a case that delay transmission is not performed at any of antennas, and it shows that a transmission delay 121 from an antenna 1 and a transmission delay 121 from an antenna 2 are performed almost simultaneously.

FIG. 2 (b) shows that a transmission delay 132 from the antenna 2 is performed [Ts/2] later than a transmission delay 131 from the antenna 1. In addition, the pulse length (transmitting pulse period) of this structure is assumed a range of [−Ts, Ts].

Figure 3:
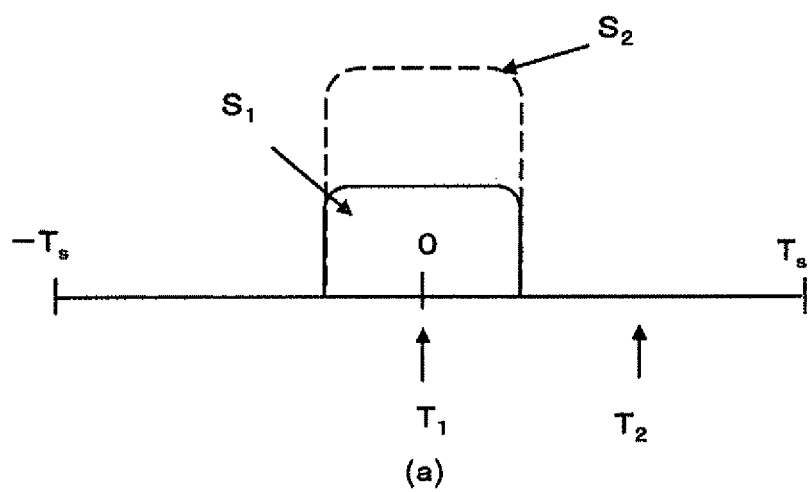
Figure 3:
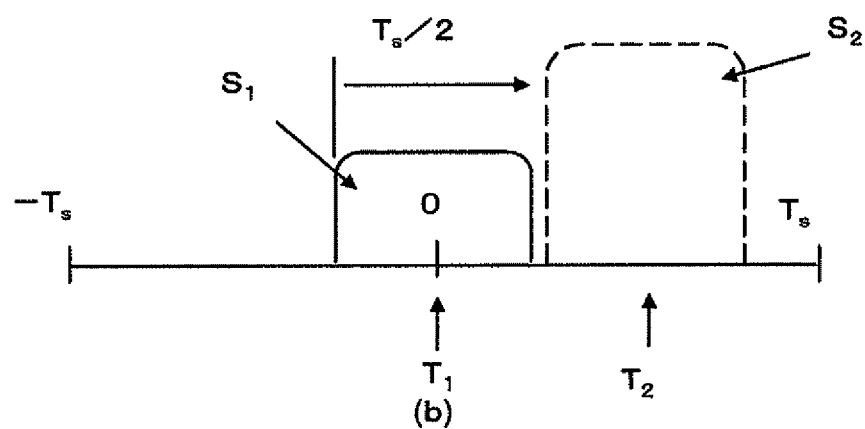

FIG. 3 is a figure showing a timing of received signal and a fractional sampling in a receiver.

The (a) of this figure shows a case that delay transmission is not performed to two signals (s1, s2), and the (b) shows a case that the signal s1 from the antenna 1 is transmitted without delay, and the signal s2 from the antenna 2 is transmitted with [Ts/2] delay.

Assuming that a transmitting signal of subcarrier k is $$s(k) = \begin{bmatrix} s_1(k) \\ s_2(k) \end{bmatrix}, \qquad \text{[Formula 1]}$$

a channel response matrix of subcarrier k is $$H(k) = \begin{bmatrix} h_{11}(k) & h_{12}(k) \\ h_{21}(k) & h_{22}(k) \end{bmatrix}, \qquad \text{[Formula 2]}$$

hij(k) represents a channel response from an antenna j to the i-th fractional sampling, $$r(k) = \begin{bmatrix} r_1(k) \\ r_2(k) \end{bmatrix} \qquad \text{[Formula 3]}$$

represents a received signal of subcarrier k, and when disregarding noise, a state without delay transmissions shown in FIG. 2(a) is expressed by $$\begin{bmatrix} r_1(k) \\ r_2(k) \end{bmatrix} = \begin{bmatrix} h_{11}(k) & h_{12}(k) \\ c(k)h_{11}(k) & c(k)h_{12}(k) \end{bmatrix} \begin{bmatrix} s_1(k) \\ s_2(k) \end{bmatrix}. \qquad \text{[Formula 4]}$$

However, the coefficient c(k) is a coefficient depending on a pulse-shaping filter etc.

As shown in a formula 4, the received signal r2(k) is multiplication value of c(k) and r1(k), and a rank of matrix of H(k) $H^H(k)$ becomes 1.

For example, when it is assumed that transmitting signal is not influenced by a filter etc and the coefficient c(k) is "0", a channel response matrix becomes as follows.

$$h(k) = \begin{bmatrix} h_{11}(k) & h_{12}(k) \\ 0 & 0 \end{bmatrix} \qquad \text{[Formula 5]}$$

Therefore, a received signal becomes $$\begin{bmatrix} r_1(k) \\ r_2(k) \end{bmatrix} = \begin{bmatrix} h_{11}(k) & h_{12}(k) \\ 0 & 0 \end{bmatrix} \begin{bmatrix} s_1(k) \\ s_2(k) \end{bmatrix}, \qquad \text{[Formula 6]}$$

and $r1(k)=h11(k)s1(k)+h12(k)s2(k)$ $r2(k)=0$.

A timing that the receiver 110 of FIG. 1 receives and processes a signal expressed by the formula 6 is shown by FIG. 3(a). The s1 of this figure is a signal of the transmitting antenna 1, and the s2 is a signal of the transmitting antenna 2.

A signal received by the antenna 111 is inputted into the 1st OFDM demodulator 113 by the switch circuit 112, and sampled at the central time (T1) of a pulse length.

Next, a signal from an antenna is inputted into the 2nd OFDM demodulator 114 by the switch circuit 112, and is sampled at the central time (T2) of period Ts. And then, the OFDM demodulator 113 and the OFDM demodulator 114 pass demodulated signals to the control circuit 115.

The r1(k) is a value sampled at T1, and it is a multiplied value of s1, s2 and each channel response.

On the other hand, the value r2(k) at the sampling time T2 is "0□h. Therefore, the signals s1 and s2 transmitted from the r1(k) and the r2(k) interfere with each other, and an error rate increases.

The 1st embodiment of this invention is for a MIMO system that receives plural signals transmitted from plural antennas by receiving antennas increased equivalently using a fractional sampling and separates the plural signals, and it is to transmit signals after delaying signals being transmitted from some of plural antennas for predetermined time. FIG. 1 shows a structure transmitting signals after delaying for [Ts/2] a signal being transmitted from the antenna 2 of the two antennas that transmit signals during a pulse length (transmitting pulse period) [−Ts, Ts] as shown in FIG. 2(b).

Assuming a size of DFT/IDFT is N, a performing delay transmission corresponds to change the formula 4 to $$\begin{bmatrix} r_1(k) \\ r_2(k) \end{bmatrix} = \begin{bmatrix} h_{11}(k) & c(k)h_{12}(k)\exp\left(\frac{j2\pi k}{N}\right) \\ c(k)h_{11}(k) & h_{12}(k) \end{bmatrix} \begin{bmatrix} s_1(k) \\ s_2(k) \end{bmatrix}. \quad \text{[Formula 7]}$$

In this case, it is possible to make the rank of the matrix $H(k)H^H(k)$ 2.

As well as the formula 5, assuming that a transmitting signal is not influenced by a filter etc. and the coefficient c(k) is "0", the channel response matrix of the formula 7 becomes $$\begin{bmatrix} h_{11}(k) & 0 \\ 0 & h_{12}(k) \end{bmatrix}, \quad \text{[Formula 8]}$$

and the received signal becomes $$\begin{bmatrix} r_1(k) \\ r_2(k) \end{bmatrix} = \begin{bmatrix} h_{11}(k) & 0 \\ 0 & h_{12}(k) \end{bmatrix} \begin{bmatrix} s_1(k) \\ s_2(k) \end{bmatrix}. \quad \text{[Formula 9]}$$

Therefore, the formulas become $r1(k)=h11(k)s1(k)$ $r2(k)=h12(k)s2(k)$ and the rank becomes 2.

This means that it receives the not delayed signal s1 from the antenna 1 at the sampling point T1, and receives the delayed signal s2 for "Ts/2" from the antenna 2 at the sampling point T2 in FIG. 3(b).

Likewise, in a case that multipaths of two or more waves exist and propagation environments from the antenna 1 and the antenna 2 to a receiving antenna are the same, the rank of matrix $H(k)H^H(k)$ is 1 as the following formula.

$$\begin{bmatrix} r_1(k) \\ r_2(k) \end{bmatrix} = \begin{bmatrix} h_{11}(k)+c_{21}(k)h_{12}(k) & h_{11}(k)+c_{21}(k)h_{12}(k) \\ c_{12}(k)h_{11}(k)+h_{12}(k) & c_{12}(k)h_{11}(k)+h_{12}(k) \end{bmatrix} \begin{bmatrix} s_1(k) \\ s_2(k) \end{bmatrix} \quad \text{[Formula 10]}$$

In addition, cij(k) is a coefficient indicating a contribution to the j-th sample of a signal by the i-th multipath.

Also in this case, it is possible to make the rank of matrix $H(k)H^H(k)$ 2 by performing delay transmission.

$$\begin{bmatrix} r_1(k) \\ r_2(k) \end{bmatrix} = \begin{bmatrix} h_{11}(k)+c_{21}(k)h_{12}(k) & \{c_{12}(k)h_{11}(k)+h_{12}(k)\}\exp\left(\frac{j2\pi k}{N}\right) \\ c_{12}(k)h_{11}(k)+h_{12}(k) & h_{11}(k)+c_{21}(k)h_{12}(k) \end{bmatrix} \begin{bmatrix} s_1(k) \\ s_2(k) \end{bmatrix} \quad \text{[Formula 11]}$$

An example shown in FIG. 1 increases the number of receiving antenna elements two virtually by performing a double fractional sampling (G=2). By increasing the number of oversampling (G), it is possible to increase the virtual number of receiving antennas.

Figure 4:
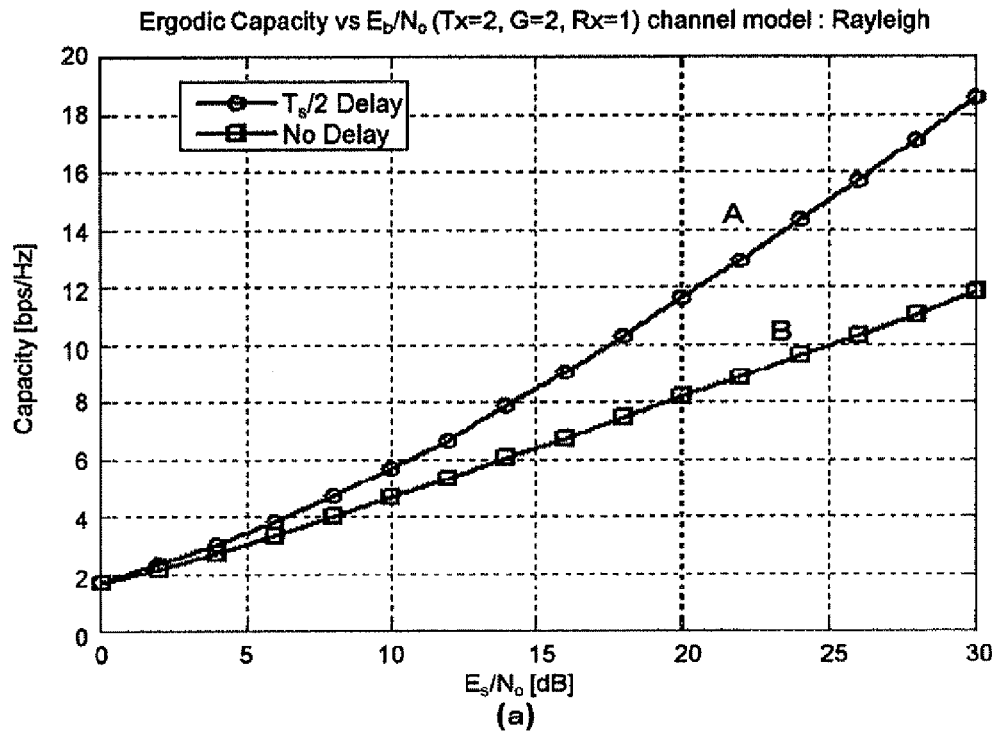
Figure 4:
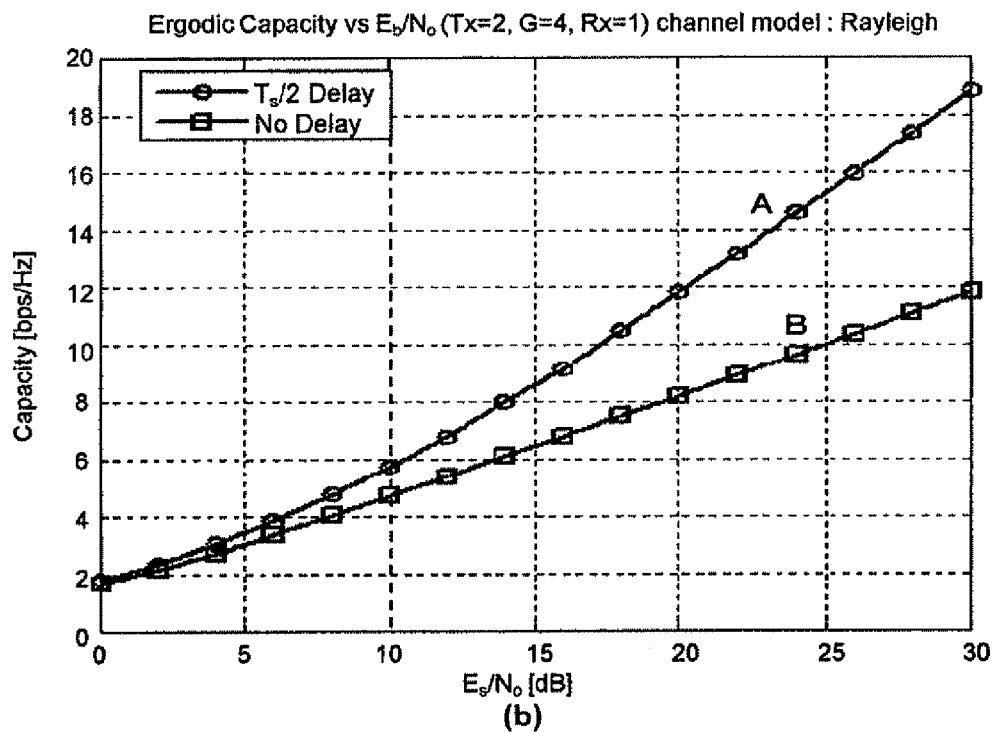

FIG. 4 shows a result of simulating channel capacity of a system that receives two signals (Tx=2) transmitted from two antennas by one antenna (Rx=1) and processes them using a fractional sampling, the graph A is a case that one of the two signals is delayed for [Ts/2], and the graph B is a case that no signal is delayed.

FIG. 4(a) shows a case of double fractional sampling (G=2), and FIG. 4(b) shows a case of 4-times fractional sampling (G=4). In addition, the horizontal axis is the ratio of signal energy to noise spectrum density (Es/N0), and the vertical axis is Ergodic capacity (bps/Hz).

It indicates that the channel capacity increases by delaying transmission signals.

Figure 5:
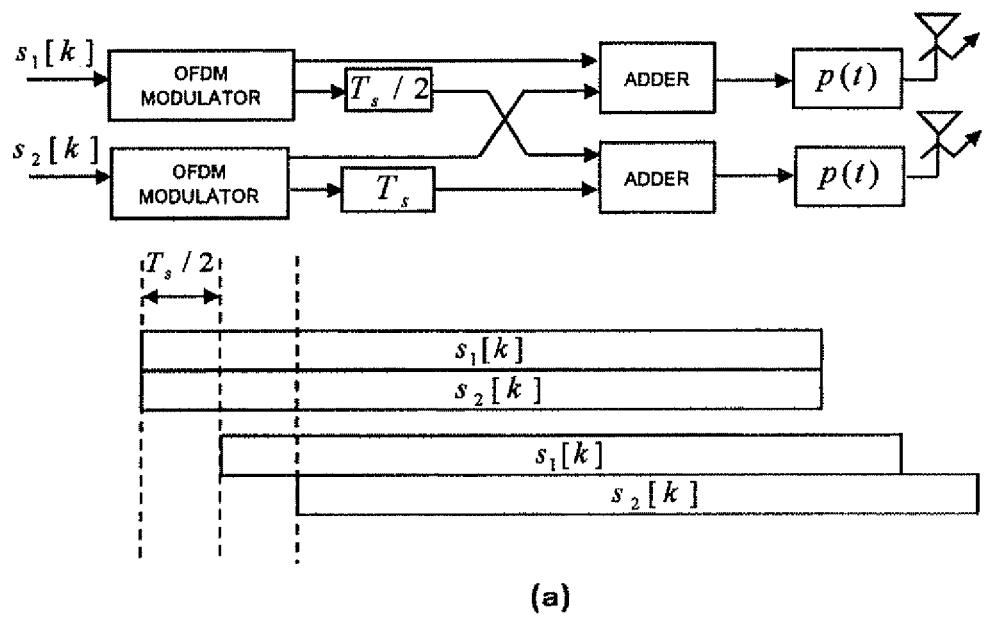
Figure 1:
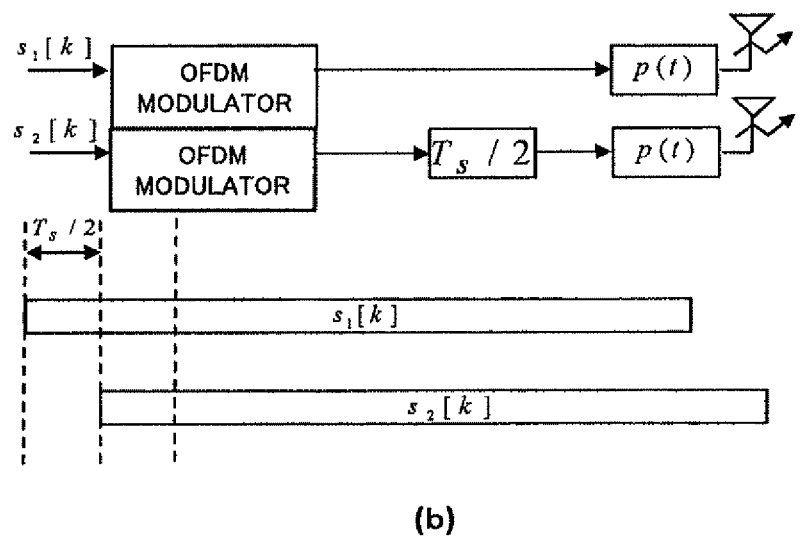
Figures 2, 5:
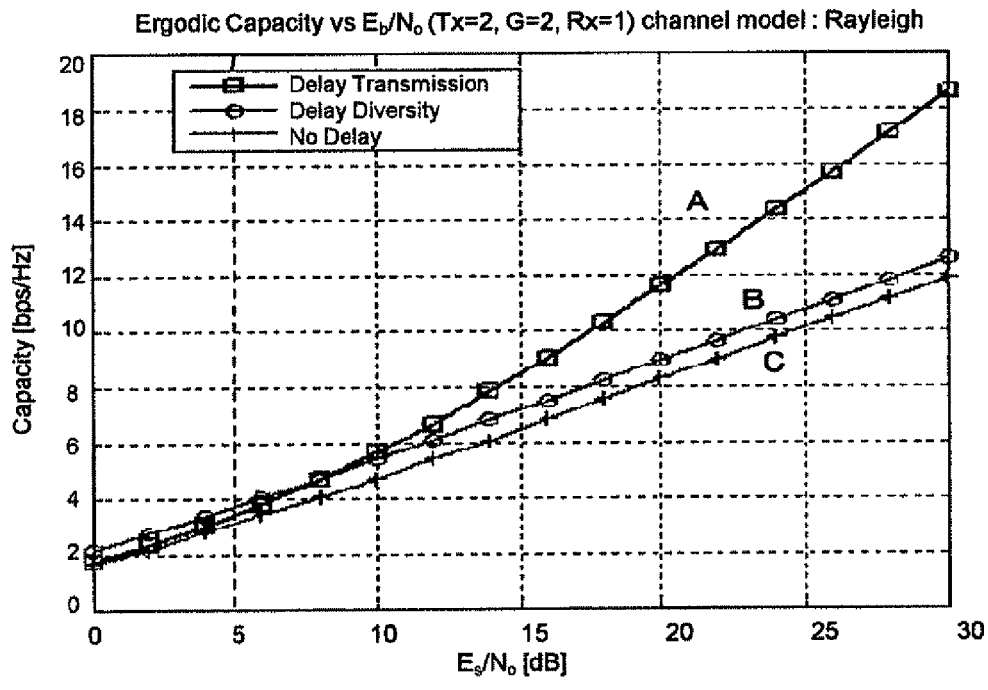

FIGS. 5-1 and 5-2 show results of simulating channel capacities of a delay transmission fractional sampling according to the 1st embodiment of this invention, and channel capacities of the conventional delay transmitting diversity receiving system of the patent-documents 1, and the horizontal axis is signal energy to noise spectrum density (Es/N0), and the vertical axis is Ergodic capacity (bps/Hz).

FIG. 5-1 shows a structure used in this simulation, the (b) is a structure concerning the 1st embodiment of this invention, one of two transmit signals s1(k) and s2(k) is delayed for [Ts/2].

Moreover, the (a) is a structure of a conventional system shown in the patent-documents 1 etc. and it consists of an antenna that transmits signals after adding two signals s1(k) and s2(k), and an antenna that transmits signals after delaying and adding two signals s1(k) and s2(k) for [Ts/2] and [Ts] respectively.

FIG. 5-2(a) shows parameters of the simulations, and the simulations are performed by double fractional sampling (G=2) with the structure of FIG. 5-1(a).

FIG. 5-2(b) shows the result of the simulation, and Graph A is a result based on the structure of FIG. 5-1(b), Graph B is a result based on the structure of FIG. 5-1(a), and Graph C is a result when the transmit signals are not delayed.

As shown in this figure, a structure according to the 1st embodiment of this invention can increase a channel capacity comparing with a structure that delay is not performed and a structure of a conventional delay transmitting diversity receiving system.

The conventional structure shown in FIG. 5-1(a) is to transmit plural and the same data series from plural antennas, and set different amount of delay among different data series.

In a case that a fractional sampling is applied to a structure, when the number of samplings and the number of data series are the same, or the number of data series is larger, a diversity effect for a specific data series is lost.

In other words, a formula corresponding to the formula 10 becomes $$\begin{bmatrix} r_1(k) \\ r_2(k) \end{bmatrix} = \begin{bmatrix} h_{11}(k) & c(k)h_{22}(k) & h_{12}(k) \\ c(k)h_{11}(k) & h_{22}(k) & c(k)h_{12}(k) \end{bmatrix} \begin{bmatrix} s_1(k) + s_2(k) \\ s_1(k) \\ s_2(k) \end{bmatrix} \quad \text{[Formula 12]}$$

And as for s2, because r1($k$) and r2($k$) indicate responses given by c(h11($k$)+h12($k$)), diversity effect cannot be acquired.

Although the example shown in FIG. 1 is a structure transmitting two signals by two antennas, a structure that transmits three or more signals using three or more antennas is also possible.

Figures 1, 6:
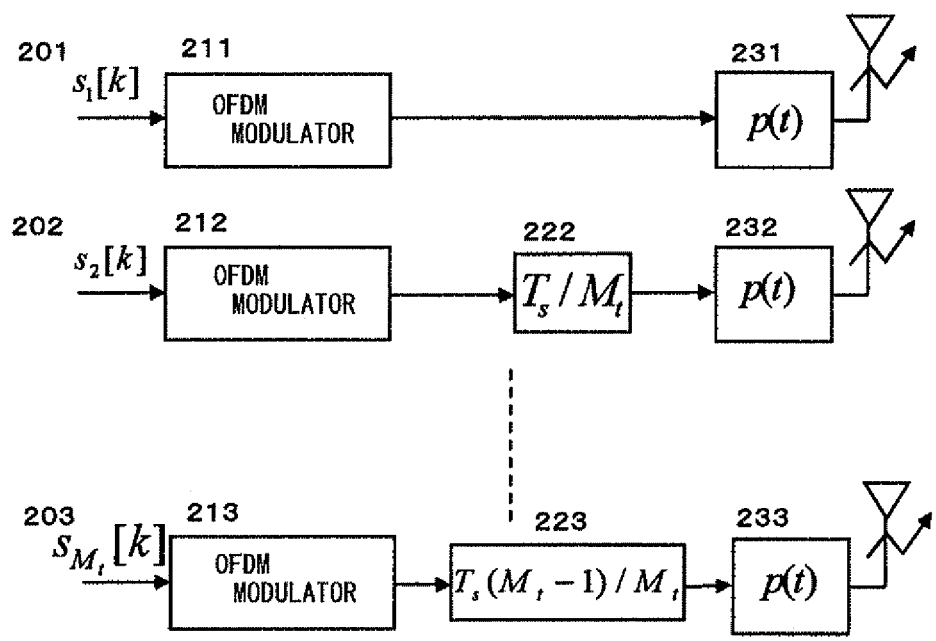
Figure 6:
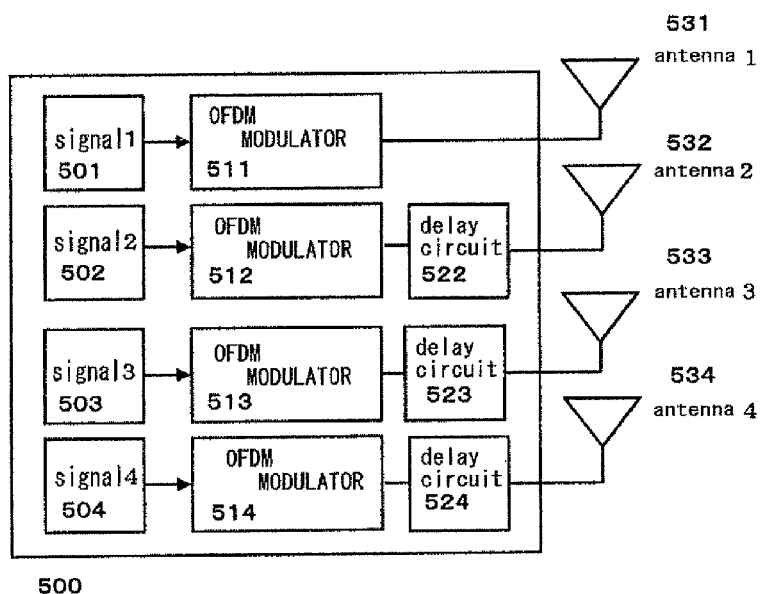
Figure 2:
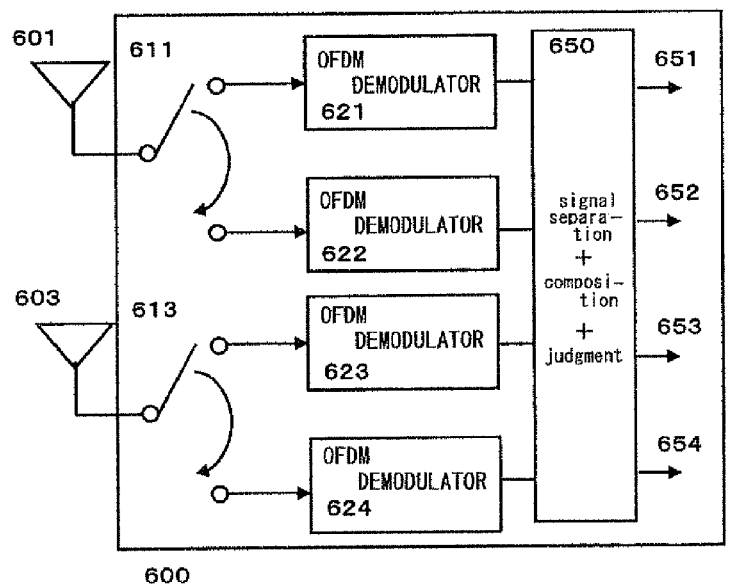

FIG. 6-1 shows a structure that the 1st embodiment of this invention is applied to a MIMO transmitting Mt signals by Mt antennas.

This figure is to delay and transmit the k-th signal (K is 2-Mt) for [Ts(K−1)/Mt], in a MIMO system that modulates Mt signals s1($k$)201-sMt($k$)203 using OFDM modulators 211-213 respectively and transmits them using transmitting circuits 231-233 ("Mt" is a positive integer.).

A receiver receives a received signal by at least Mt times fractional sampling (G=Mt), and then distinguishes a channel response matrix.

FIG. 6-2 is an example that assuming the number of transmitting antennas of the transmitter is four (Mt=4) and the number of receiving antennas of the receiver is two, a fractional sampling of each received signal is twice (G=2) in the structure shown in FIG. 6-1.

After four signals, signal 1-signal 4 (501-504) from a transmitter 500, are modulated by a OFDM modulators 511-514, amounts of delay shown in the FIG. 6-1 are given by a delay circuits 522-524 that correspond respectively, and they are transmitted from antennas 531-534.

In addition, since the amount of delay of the signal 1 (510) is zero, the output of the OFDM modulator 511 is transmitted from an antenna 531, without using a delay circuit.

A structure that is composed of an antenna 601 of a receiving circuit 600, a switch circuit 611, a 1st OFDM demodulator 621, and a 2nd OFDM demodulator 622, and a structure that is composed of an antenna 603, a switch circuit 613, a 1st OFDM demodulator 623, and a 2nd OFDM demodulator 624 correspond to the structure that is composed of the antenna 111 of the receiving circuit 110 shown, in FIG. 1, the switch circuit 112, the 1st OFDM demodulator 113, and the 2nd OFDM demodulator 114.

The switch circuit 611 and the switch circuit 613 perform double fractional sampling to signals received by the antenna 601 and the antenna 603, and then input them into the OFDM demodulators 621-624. Four signals demodulated by the OFDM demodulators 621-624 are passed to a control circuit 650, and a channel response matrix between the transmitter 500 and the receiver 600 is obtained according to a technique of MIMO.

For receiving data, the control circuit 650 separates and output four outputs 651-654 corresponding to the signal 1-signal 4 (510-504) that the transmitter 500 transmitted, from the output signals of the OFDM demodulators 621-624 using the above-mentioned channel response matrix.

In FIG. 6-2, assuming that a transmitting signal of a certain subcarrier k is $$S(k) = [S_1(k)\ S_2(k)\ S_3(k)\ S_4(k)]^T \quad \text{[Formula 13]}$$

a channel response from the j-th transmitting antenna in the subcarrier k to the i-th fractional sampling of the m-th receiving antenna is $$h_{ij}^{(m)}(k) \quad \text{[Formula 14]}$$

a received signal at the i-th fractional sampling point of the m-th receiving antenna in the subcarrier k $$r_i^{(m)}(k) \quad \text{[Formula 15]}$$

a channel response matrix of the m-th receiving antenna in the subcarrier k is $$h^{(m)}(k) = \begin{bmatrix} h_{11}^{(m)}(k) & h_{12}^{(m)}(k) & h_{13}^{(m)}(k) & h_{14}^{(m)}(k) \\ h_{21}^{(m)}(k) & h_{22}^{(m)}(k) & h_{23}^{(m)}(k) & h_{24}^{(m)}(k) \end{bmatrix}, \quad \text{[Formula 16]}$$

a received signal of the m-th receiving antenna in the subcarrier k is $$r^{(m)}(k) = \begin{bmatrix} r_1^{(m)}(k) \\ r_2^{(m)}(k) \end{bmatrix}, \quad \text{[Formula 17]}$$

and noise is ignored, in a case that four transmitting antennas, two receiving antennas, double oversampling and transmitting delay is not inserted in any of antennas, the formula becomes $$\begin{bmatrix} r_1^{(1)}(k) \\ r_2^{(1)}(k) \\ r_1^{(2)}(k) \\ r_2^{(2)}(k) \end{bmatrix} = \begin{bmatrix} h_{11}^{(1)}(k) & h_{12}^{(1)}(k) & h_{13}^{(1)}(k) & h_{14}^{(1)}(k) \\ h_{21}^{(1)}(k) & h_{22}^{(1)}(k) & h_{23}^{(1)}(k) & h_{24}^{(1)}(k) \\ h_{11}^{(2)}(k) & h_{12}^{(2)}(k) & h_{13}^{(2)}(k) & h_{14}^{(2)}(k) \\ h_{21}^{(2)}(k) & h_{22}^{(2)}(k) & h_{23}^{(2)}(k) & h_{24}^{(2)}(k) \end{bmatrix} \begin{bmatrix} s_1(k) \\ s_2(k) \\ s_3(k) \\ s_4(k) \end{bmatrix} \quad \text{[Formula 18]}$$

$$= \begin{bmatrix} h_{11}^{(1)}(k)p(0) & h_{12}^{(1)}(k)p(0) \\ h_{11}^{(1)}(k)\left\{p\left(-\frac{2}{4}\right)\exp\left(j\frac{2\pi k}{N}\right) + p\left(\frac{2}{4}\right)\right\} & h_{12}^{(1)}(k)\left\{p\left(-\frac{2}{4}\right)\exp\left(j\frac{2\pi k}{N}\right) + p\left(\frac{2}{4}\right)\right\} \\ h_{11}^{(2)}(k)p(0) & h_{12}^{(2)}(k)p(0) \\ h_{11}^{(2)}(k)\left\{p\left(-\frac{2}{4}\right)\exp\left(j\frac{2\pi k}{N}\right) + p\left(\frac{2}{4}\right)\right\} & h_{12}^{(2)}(k)\left\{p\left(-\frac{2}{4}\right)\exp\left(j\frac{2\pi k}{N}\right) + p\left(\frac{2}{4}\right)\right\} \end{bmatrix}$$

-continued $$\begin{bmatrix} h_{13}^{(1)}(k)p(0) & h_{14}^{(1)}(k)p(0) \\ h_{13}^{(1)}(k)\left\{p\left(-\frac{2}{4}\right)\exp\left(j\frac{2\pi k}{N}\right)+p\left(\frac{2}{4}\right)\right\} & h_{14}^{(1)}(k)\left\{p\left(-\frac{2}{4}\right)\exp\left(j\frac{2\pi k}{N}\right)+p\left(\frac{2}{4}\right)\right\} \\ h_{13}^{(2)}(k)p(0) & h_{14}^{(2)}(k)p(0) \\ h_{13}^{(2)}(k)\left\{p\left(-\frac{2}{4}\right)\exp\left(j\frac{2\pi k}{N}\right)+p\left(\frac{2}{4}\right)\right\} & h_{14}^{(2)}(k)\left\{p\left(-\frac{2}{4}\right)\exp\left(j\frac{2\pi k}{N}\right)+p\left(\frac{2}{4}\right)\right\} \end{bmatrix}\begin{bmatrix} s_1(k) \\ s_2(k) \\ s_3(k) \\ s_4(k) \end{bmatrix}$$

However, the response includes a response of pulse-shaping filter that corresponds to baseband filters of the transmitter and the receiver about delay are added.

In this case, the rank of a channel response matrix becomes 2 at the maximum.

On the other hand, when transmitting signals after inserting a delay for [Ts(K−1)/4] in the K-th transmitting antenna, a received signal is expressed as follows.

[Formula 19]

$$\begin{bmatrix} r_1^{(1)}(k) \\ r_2^{(1)}(k) \\ r_1^{(2)}(k) \\ r_2^{(2)}(k) \end{bmatrix} = \begin{bmatrix} h_{11}^{(1)}(k) & h_{12}^{(1)}(k) & h_{13}^{(1)}(k) & h_{14}^{(1)}(k) \\ h_{21}^{(1)}(k) & h_{22}^{(1)}(k) & h_{23}^{(1)}(k) & h_{24}^{(1)}(k) \\ h_{11}^{(2)}(k) & h_{12}^{(2)}(k) & h_{13}^{(2)}(k) & h_{14}^{(2)}(k) \\ h_{21}^{(2)}(k) & h_{22}^{(2)}(k) & h_{23}^{(2)}(k) & h_{24}^{(2)}(k) \end{bmatrix} \begin{bmatrix} s_1(k) \\ s_2(k) \\ s_3(k) \\ s_4(k) \end{bmatrix}$$

$$= \begin{bmatrix} h_{11}^{(1)}(k)p(0) & h_{12}^{(1)}(k)\left\{p\left(-\frac{1}{4}\right)+p\left(\frac{3}{4}\right)\exp\left(-j\frac{2\pi k}{N}\right)\right\} & \cdots \\ h_{11}^{(1)}(k)\left\{p\left(-\frac{2}{4}\right)\exp\left(j\frac{2\pi k}{N}\right)+p\left(\frac{2}{4}\right)\right\} & h_{12}^{(1)}(k)\left\{p\left(-\frac{3}{4}\right)\exp\left(j\frac{2\pi k}{N}\right)+p\left(\frac{1}{4}\right)\right\} & \cdots \\ h_{11}^{(2)}(k)p(0) & h_{12}^{(2)}(k)\left\{p\left(-\frac{1}{4}\right)+p\left(\frac{3}{4}\right)\exp\left(-j\frac{2\pi k}{N}\right)\right\} & \cdots \\ h_{11}^{(2)}(k)\left\{p\left(-\frac{2}{4}\right)\exp\left(j\frac{2\pi k}{N}\right)+p\left(\frac{2}{4}\right)\right\} & h_{12}^{(2)}(k)\left\{p\left(-\frac{3}{4}\right)\exp\left(j\frac{2\pi k}{N}\right)+p\left(\frac{1}{4}\right)\right\} & \cdots \end{bmatrix} \begin{bmatrix} s_1(k) \\ s_2(k) \\ s_3(k) \\ s_4(k) \end{bmatrix}.$$

In this case, the rank of a matrix becomes 4.

Although a MIMO system can increase a communication capacity using plural communication channels for a single carrier, it is necessary to set the corresponding number of antennas to the number of channels keeping distance for attaining diversity.

However, it is difficult to install plural antennas keeping enough distance for attaining diversity in a small mobile terminal.

The 1st embodiment of this invention has a structure that increases the number of receiving antennas virtually by performing fractional sampling to receive signals, and that transmits signals after delaying transmitting signals for delays corresponding to the fractional sampling.

By the above-mentioned structure, the receiver becomes possible to increase the number of receiving antennas virtually, and it becomes unnecessary to install plural antennas in small cases, such as a mobile machine.

In addition, the transmitter changes channel responses between the transmitter and the receiver to a state that separations among each signal are possible by delaying transmitting signals for delays corresponding to the fractional sampling of the receiver.

The Second Embodiment

The 1st embodiment is applied to a case that a communication distance is short comparatively and used for an indoor communication like UWB (ultra wideband), a transmitter and a receiver are in a line-of-sight condition, and amount of delay from an antenna is small, and it is expected that a channel response corresponds to the formula 4, so that a predetermined amount of delay is inserted in a transmitting signal beforehand.

However, for a portable receiver, a position relation between a transmitter and a receiver changes, and channel response characteristics also change.

Therefore, sufficient effect cannot be acquired by a structure that a predetermined amount of delay is inserted in transmitting signals beforehand.

The 2nd embodiment of this invention is characterized by determining whether it is necessary to insert a predetermined amount of delay in transmitting signals according to channel response characteristics between a transmitter and a receiver.

Figure 7:
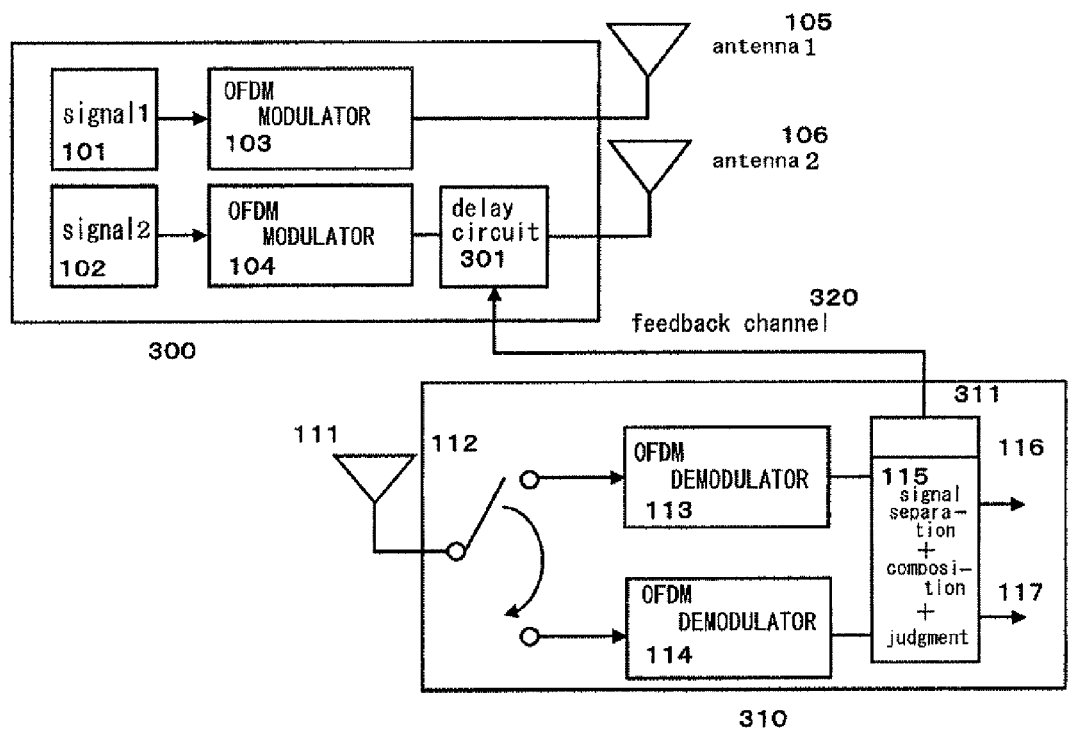
FIG. 7 A figure showing a structure of the 2nd embodiment

FIG. 7 is a block diagram of the 2nd embodiment of this invention. A transmitter 300 of this embodiment includes a delay circuit 301 that delays transmitting signals for a predetermined time according to a direction of a receiver 310.

Moreover, the receiver 310 includes a judgment circuit 311 that directs that the transmitter 300 delays the transmitting signals according to channel response characteristics between the transmitter 300 and the receiver 310.

The judgment circuit 311 uses a link from the receiver 310 to the transmitter 300 as a feedback channel 320, and transmit the above-mentioned delay directions to the transmitter 300.

The transmitter 300 controls the delay circuit 301 according to the above-mentioned directions to delay an output of a OFDM modulator 104 for the predetermined time, and transmits it from an antenna 2.

Before transmitting real data, the MIMO system transmits preambles, such as a PN code.

The receiver 310 receives the preamble and calculates each channel response characteristics H(K) between the transmitter 300 and the receiver 310 from the characteristic of the received signal.

The judgment circuit 311 of the receiver 310 in the 2nd embodiment of this invention analyzes channel response characteristics H(K), and judges whether a sufficient response characteristics for separating two real data transmitted from the transmitter 300 will be acquired in a real data receiving.

When the channel response corresponds to the formula 4 or the formula 10, the receiver transmits delay directions to the transmitter 300 through the feedback channel 320.

The transmitter 300 that received the directions controls the delay circuit 301 being installed between the OFDM modulator 104 and a transmitting circuit of the antenna 2, and inserts delay for [Ts/2] in the signal 2 modulated by the OFDM modulator 104.

The 1st embodiment inserts the predetermined amount of delay in the transmitting signal beforehand.

In a portable receiver such as a cellular phone, by an environment changing greatly, the channel response characteristics also change greatly.

When good channel response characteristics are detected, it is not necessary to insert a delay in a transmitting signal by a transmitting side, and it is enough to insert a delay only when the communication environment is not good.

The 2nd structure is to determine whether a transmitting signal should be delayed based on the channel response characteristics H(K) measured by a receiver.

The structure of this embodiment detects a case that channel response characteristics are not good and delays are required, and then inserts delays in transmitting signals.

Moreover, when the channel response characteristics are good and delay is not required, transmitting signals are not delayed.

Therefore, there is no case that channel response characteristics are worsened by inserting a unnecessary delay further, and it is possible to maintain a good receiving condition even for a portable receiver that receiving environments change greatly.

The structure shown in FIG. 7 is that the receiver 310 determines whether a transmitting signal should be delayed based on channel response characteristics H(K), and transmits a delay direction to the transmitter 300 through the feedback channel 320.

However, it is also possible to make the structure that the receiver 310 transmits the channel response characteristics H(K) to the transmitter 300 and the transmitter 300 determine whether transmitting signal should be delayed.

By this structure, the transmitter 300 does not need to have a means for determining necessity of delay, and it is possible to simplify the structure of a receiver.

Although FIG. 7 shows an example that two signals are transmitted using two antennas in the 2nd embodiment, a structure that three or more signals are transmitted simultaneously using three or more antennas as shown in FIG. 6-1 and FIG. 6-2 is also possible.

In this case, it becomes a structure that the receiver 600 of FIG. 6-2 determines whether each transmitting signal should be delayed based on the channel response characteristics H(K) and directs the transmitter 500 through a feedback channel to delay transmitting signals, or a structure that the receiver 600 transmits the channel response characteristics H(K) to the transmitter 500, and the transmitter 500 determines whether each transmitting signal should be delayed.

The Third Embodiment

Figure 8:
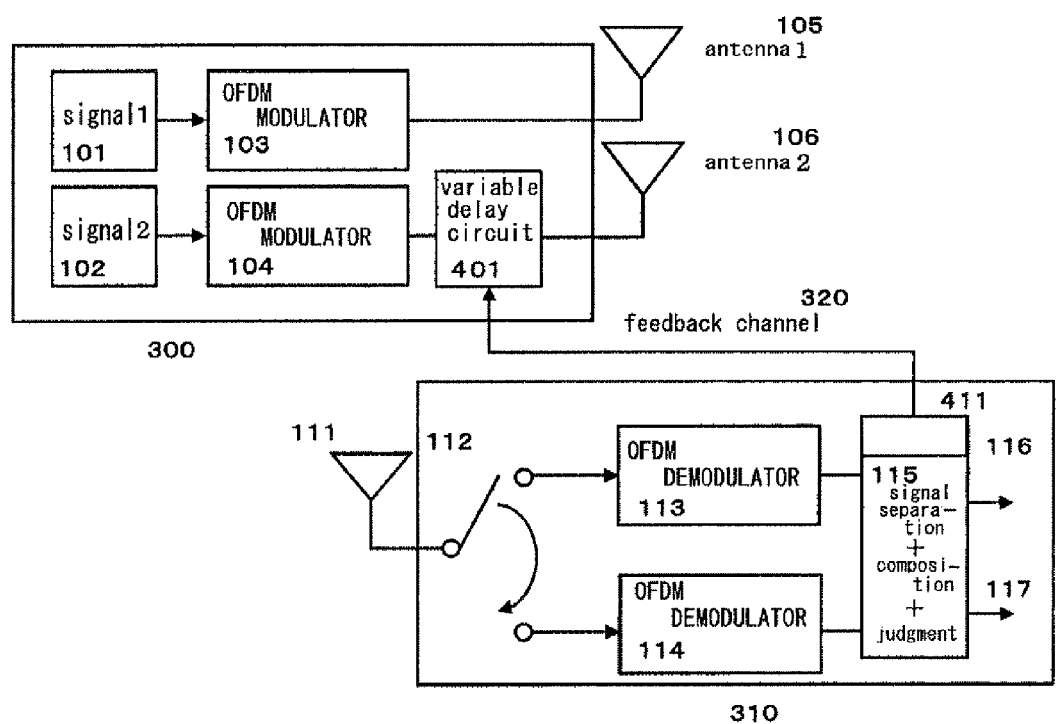
FIG. 8 A figure showing a structure of the 3rd embodiment

FIG. 8 is a block diagram of the 3rd embodiment of this invention. A receiver 410 of the 3rd embodiment includes a judgment circuit 411 that determines amount of delays to maximize the channel capacity from channel response characteristics between a transmitters 400, and directs the transmitter to delay transmitting signals for the amount of delays.

The judgment circuit 411 transmits delay insert directions to the transmitter 400 using a link from the receiver to the transmitter 400 as a feedback channel 420.

To determine the amount of delay, it is controlled to maximize the channel capacity expressed by the formula 13, for example.

$$C = \frac{1}{N}\sum_{k=1}^{N} \log_2[\det(I + \Gamma H(k)H^H(k))],$$ [Formula 20]

here, N is the number of subcarriers of an OFDN modulation method, and gamma is a signal-to-noise power ratio.

The transmitter 400 that received delay insert directions and information about the amount of delays from the receiver 410, controls a variable delay circuit 401 to delay output signals from the OFDM modulator 104 for the directed time and transmits them from the antenna 2.

The 3rd embodiment investigates amount of delays that make channel response characteristics between the transmitter and the receiver best, and controls transmissions of the transmitter based on the amount of delays.

Therefore, it becomes possible to obtain a good channel capacity accorded to the communication environment between the transmitter and the receiver.

Moreover, like the 2nd embodiment, it is possible to make the structure that the receiver feeds back detected information about responses of a channel to the transmitter, and the transmitter determines the optimal amount of delays based on the channel response characteristics, and delays transmitting signals.

Although FIG. 8 shows an example that transmits two signals using two antennas in the 3rd embodiment, the structure that transmits three or more signals simultaneously using three or more antennas as shown in FIG. 6-1 and FIG. 6-2 is also possible.

In this case, the structure becomes that the receiver 600 of FIG. 6-2 determines amount of delays of each transmitting signal that channel response characteristics become best based on the channel response characteristics H(K), and directs the transmitter 500 to delay transmitting signals for the amount of delays, or a structure that the channel response characteristics H(K) are transmitted from the receiver 600 to the transmitter 500, and the transmitter 500 determines the optimal amount of delays of each transmitting signal.

INDUSTRIAL APPLICABILITY

This invention relates to a MIMO system, and especially to a MIMO system that a receiver performs a fractional sampling of a signal received by an antenna, and the number of receiving antennas are increased equivalently.

The 1st embodiment of this invention is a structure that a transmitter delays and transmits a part of transmitting signals for the optimal amount of delay decided from the number of oversampling of a fractional sampling and a pulse length of a transmitting signal beforehand. By this structure, it becomes possible to acquire good channel response characteristics easily in a MIMO system using a fractional sampling. The 2nd embodiment has a structure for judging whether a transmitter should delay signals based on channel response characteristics detected by a receiver.

In a movable receiver such as a cellular phone, channel response characteristics between a transmitter and a receiver may change greatly by a receiver moving.

This embodiment includes a structure to determine whether a transmitting should transmit signal after delaying signals based on channel response characteristics detected by the receiver.

By this structure it becomes possible to acquire good channel response characteristics, even for a portable receiver.

The 3rd embodiment includes a structure to seek an amount of delay that a channel capacity becomes maximum based on channel response characteristics detected by the receiver, and then delay signals that a transmitter transmits based on the amount of delays.

By the structure concerned, it becomes possible to acquire the optimal channel response characteristics between a portable receiver and a portable transmitter, even if the communication environment between both changed greatly.

Moreover, the structure of this invention is effective also for a MIMO system using OFDM diversity receiving system using time shift sampling.

The structures shown in FIG. 1 to FIG. 8 transmits different signals from each of plural antennas of a transmitter, and performs fractional sampling to signals received by each antenna of one or plural antennas installed in a receiver, and then the receiver retrieves plural different signals transmitted by the transmitter with a control circuit that performs separation, composition and judgment.

However, it is also possible to delay the same signal for predetermined amount and transmits from plural antennas of a transmitter.

In this case, a receiver performs fractional sampling to signals received by each antenna, and then the control circuit separates the signal transmitted from plural antennas of the transmitter. Next, the separated signals are added and an expected signal is acquired.

By this structure, it becomes possible to make the energy of a transmitting signal increase.

The invention claimed is:

1. A multi-carrier communications system, comprising:
   a transmitter that transmits plural data series by the same subcarrier from plural antennas and a receiver that receives the plural data series with plural antennas; wherein:
   the transmitter transmits the plural data series with a transmitting pulse period [−Ts, Ts], and a multiplicity of transmitting signal Mt, and includes a means for delaying the k-th (2<=K<=Mt) transmitting signal of a part series of the plural data series for Ts(K−1)/Mt from the first transmitting signal and transmitting from the plural antennas, and
   the receiver includes a means for receiving the signals transmitted from the transmitter with each antenna of the one or plural antennas and performing fractional sampling to the received signals, and a means for demodulating data of the plural data series obtained by the fractional sampling.

2. The multi-carrier communications system as set forth in claim 1, said receiver includes:
   a means for judging good or bad of qualities of channel response characteristics of received multi-carrier signals, and
   a means for indicating to the transmitter to transmit signals after delaying signals for the predetermined time based on a judgment of the means for judging.

3. The multi-carrier communications system as set forth in claim 1, said receiver includes:
   a means for transmitting data about channel response characteristics of received multi-carrier signals to the transmitter,
   a means for judging qualities of the channel response characteristics based on the data about the channel response characteristics that the receiver transmitted, and
   a means for delaying signals for the predetermined time based on a judgment of the means for judging.

4. The multi-carrier communications system as set forth in claim 1, said receiver includes:
   a means for determining a necessary amount of delay by the channel response characteristics of a received multi-carrier signal, and
   a means for indicating to the transmitter to delay and transmit signals based on the judged amount.

5. The multi-carrier communications system as set forth in claim 1, said receiver includes:
   a means for transmitting a data about channel response characteristics of a received multi-carrier signal to the transmitter,
   a means for determining a necessary amount of delay by the channel response characteristics that the receiver transmitted, and
   a means for delaying a transmission of signals based on the determined amount of delay.

* * * * *